United States Patent

Hutchin

[11] Patent Number: 5,969,334
[45] Date of Patent: Oct. 19, 1999

[54] MULTI-PULSE LASER PHOTOGRAPHY

[75] Inventor: Richard A. Hutchin, Marlboro, Mass.

[73] Assignee: Hughes Danbury Optical Systems, Inc., Danbury, Conn.

[21] Appl. No.: 06/786,921

[22] Filed: May 6, 1985

[51] Int. Cl.[6] .................. G01J 1/20; H04N 7/18; H04N 9/47
[52] U.S. Cl. .................. 250/201.9; 348/131; 348/135
[58] Field of Search .................. 332/7.51; 356/345, 356/353, 359, 360; 89/41.06; 343/17; 250/201.9; 348/131, 135; 342/179

[56] References Cited

U.S. PATENT DOCUMENTS

| | | | |
|---|---|---|---|
| 3,359,852 | 12/1967 | Wilczynski et al. | 356/359 |
| 4,145,140 | 3/1979 | Fujii | 356/360 |
| 4,265,539 | 5/1981 | Gaffard | 356/353 X |
| 4,352,565 | 10/1982 | Rowe et al. | 356/360 |
| 4,474,467 | 10/1984 | Hardy et al. | 356/353 |
| 4,584,484 | 4/1986 | Hutchin | 356/359 X |

*Primary Examiner*—Stephen C. Buczinsi
*Attorney, Agent, or Firm*—W. C. Schubert; W. K. Denson-Low

[57] ABSTRACT

An array of a large number of low quality light collectors measure light generated by arrays of coherent light illuminators and rebounded from a target. The resulting data is utilized to derive the resulting speckle pattern which in turn is Fourier transformed to reconstruct the target image.

38 Claims, 3 Drawing Sheets

TARGET 24

ATMOSPHERE 23

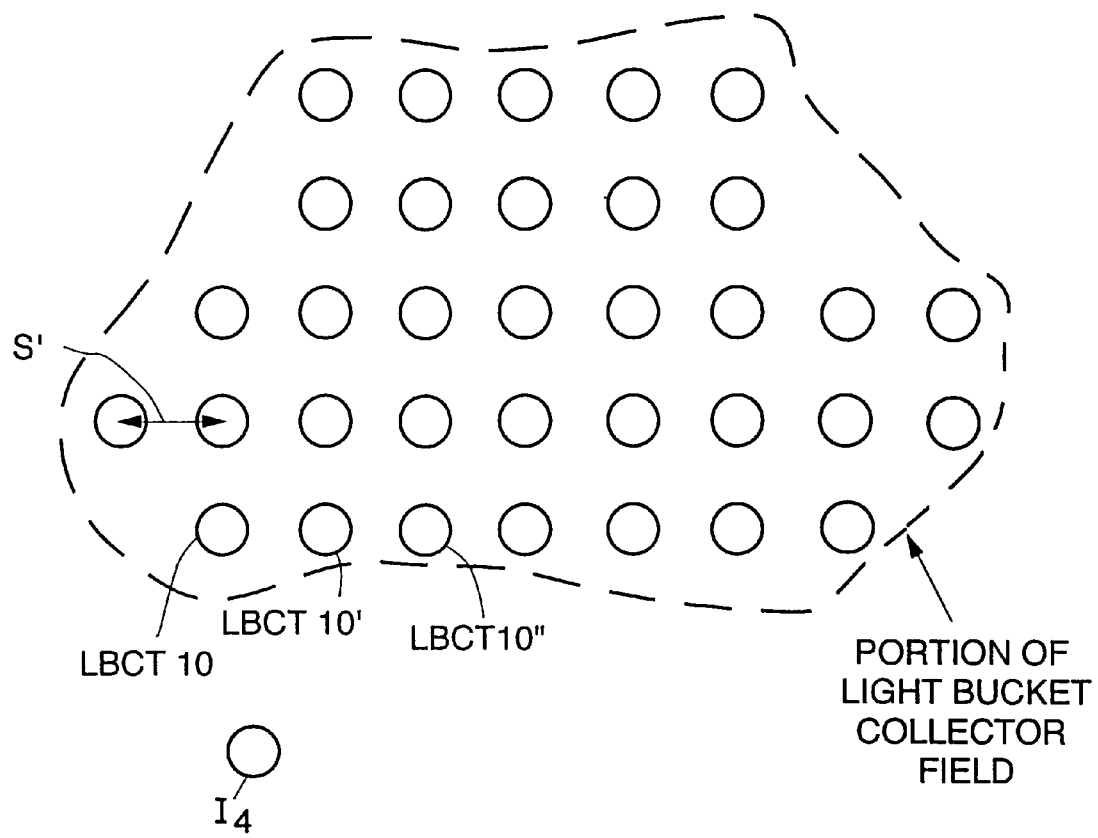
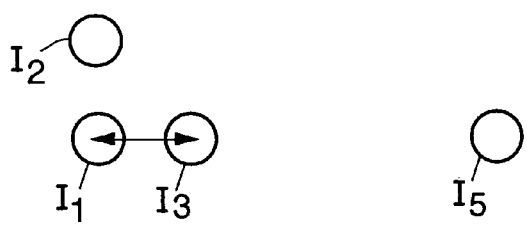
FIG. 2.

MULTI-PULSE LASER PHOTOGRAPHY

This invention was made with Government support under Air Force Contract No. F30602-85-C-0301 awarded by Rome Air Development Center, Griffiss Air Force Base, New York. The Government has certain rights in this invention.

The present invention relates to the field of imaging remote non-cooperative targets viewed through the atmosphere.

One approach to producing high resolution imagery of a remote target viewed through the atmosphere is designated pulsed laser photography (PLP) and employs active illumination of the target to measure both the aberrated target image and the wave front aberration. It is analogous to a compensated imaging system (CIS) except that is uses only wave front sensors, and compensation is performed electronically in a computer rather than with a deformable mirror. This system produces equivalent performance to regular compensated imaging without the compensation hardware, including the deformable mirror and actuators therefore. In such a regular compensation system wave front errors due to atmospheric turbulence in the propagation path and other wave front errors due to for example thermal shifts, are compensated by employing an A.C. shearing interferometer, a parallel analog data processor, and a piezoelectric active mirror arranged in a closed loop configuration. For a description of such a CIS system see "Real Time Atmospheric Compensation" by J. W. Hardy et al Journal of the Optical Society of America volume 67 #3, March 1977; see also my paper in the Journal of the Optical Society of America volume 67 #3, March 1977 entitled "Wave Front Reconstruction for Compensated Imaging". Reference may also be made to U.S. Pat. No. 3,923,400 to John W. Hardy describing a CIS system.

Pulse laser photography (PLP) is an imaging concept which utilizes the inherent difference between coherent and incoherent illumination to generate diffraction limited (coherent) images of a non-cooperative target through any aberrating medium. In this system the target is illuminated in rapid succession with two laser pulses, one narrow-band and one wide-band. The return wave fronts are measured with a self referencing interferometer and the two wave fronts are digitally processed to form the image.

PLP works by measuring the amplitude and phase of the light scattered from a distant target. The target is illuminated first by a narrow-band laser pulse ($\leq 10^{-3\circ}$ A bandwidth) and then by a broadband laser pulse ($\geq 1°$ A bandwidth). The narrow-band pulse has a sufficiently long coherence length that, when scattered from the target, it forms a high quality speckle image pattern back at the sensor. This speckle pattern can be regarded as a wave front received at the aperture, and it can be measured in amplitude and phase using a pulsed interferometer. If there were no aberrations due to optics or atmosphere, then this wave front pattern could be Fourier transformed to give the diffraction-limited target image. This Fourier transform is normally performed by the sensor optics, but it can be just as well performed digitally if the wave front is measured.

When aberrations are present, the wave front is distorted and a severely degraded image will appear in a normal imaging sensor; the distortions must be corrected before the transformation is performed. This correction can be accomplished in real time by measuring the aberrations and removing them with an active deformable mirror as in the Compensated Imaging System (CIS) or, PLP technique, by recording the aberrations and removing them by digital processing.

The aberrations are recorded using a broadband laser pulse that washes out the target speckle pattern and leaves only the aberrations. In effect, the target becomes an incoherently illuminated source that is used just as in CIS to measure the optical path aberrations due to turbulence or distorted optics.

The wave front sensor measures the wave fronts from both pulses. The coherent pulse contains information about the target structure and the distortion from the atmosphere. The incoherent pulse has only the distortion information. The target information in the narrow-band pulse is in the form of a speckle pattern that is the result of the mutual interference from all points in the object. The broadband pulse does not contain this information as there is no coherence between any two points in the object. Both wave fronts contain information about the atmospheric distortion through which they have passed in the form of a varying phase function.

Once the wave fronts are recorded, digital processing is used to extract the target information from the pulses. The phase function measured by the incoherent wave front is subtracted from the phase function measured by the coherent wave front. This result is Fourier transformed into image space to obtain a diffraction-limited image of the target.

The PLP technique is the subject of my co-pending U.S. patent application Ser. No. 786,920 filed May 6, 1985 and would appear to require a large monolithic or phased arrayed telescope with a wave front quality of 5–10 waves rms. While such a telescope is considered low quality for astronomical purposes, it is still very expensive when contemplating one hundred meter diameter apertures.

Thus it is an object of the present invention to eliminate the need for such a telescope. It is a further object of the prefer invention to provide a large array of inexpensive light bucket collectors for gathering the light propagated through the atmosphere and rebounded from the target and whereby almost all effects of atmospheric turbulence have been removed. The scintillation patterns of high altitude turbulence do shift light over a few centimeters, but since these shifts are small compared to the preferred one meter light bucket collector diameters, the measurements produced in accordance with the teachings of the invention become the same as if all of the earth's atmosphere were removed. And the intensity pattern may be measured with a one meter resolution (instead of 5–10 centimeter) usually required for compensated imaging, thereby saving at least a factor of one hundred in laser energy.

SUMMARY OF A PREFERRED METHOD OF THE INVENTION

In accordance with a preferred method of carrying out the invention, an array of a large number of light sensors or collectors of about one meter in diameter is provided, wherein the array has a diameter of up to one hundred meters and consists of typically ten thousand light collectors. First and second linear arrays of coherent light illuminators are also provided and are relatively closely spaced. Each coherent illuminator is frequency shifted with respect to the other illuminators. The light from the illuminators is scattered off the target to form speckle patterns which interfere with each other with known temporal frequencies, the different frequencies of the interference patterns being established by the beat frequencies between the coherent illuminators. A data processor stores and then transforms each of the collector signals indicative of the varying light intensity received over the period of examination, typically about one microsecond, and the phases and amplitudes of each sinosoidal frequency component are derived, which are utilized to reconstruct the phases and amplitudes of the speckle pattern produced by illuminating the target through the atmosphere. Thereafter the processor Fourier transforms the speckle pattern data to obtain an image of the target.

Other objects, features, and advantages of the present invention will become apparent upon study of the following specific description taken in conjunction with the drawings in which:

FIG. 2 illustrates a plan view of the various components of FIG. 1;

SPECIFIC DESCRIPTION

Figure 1:
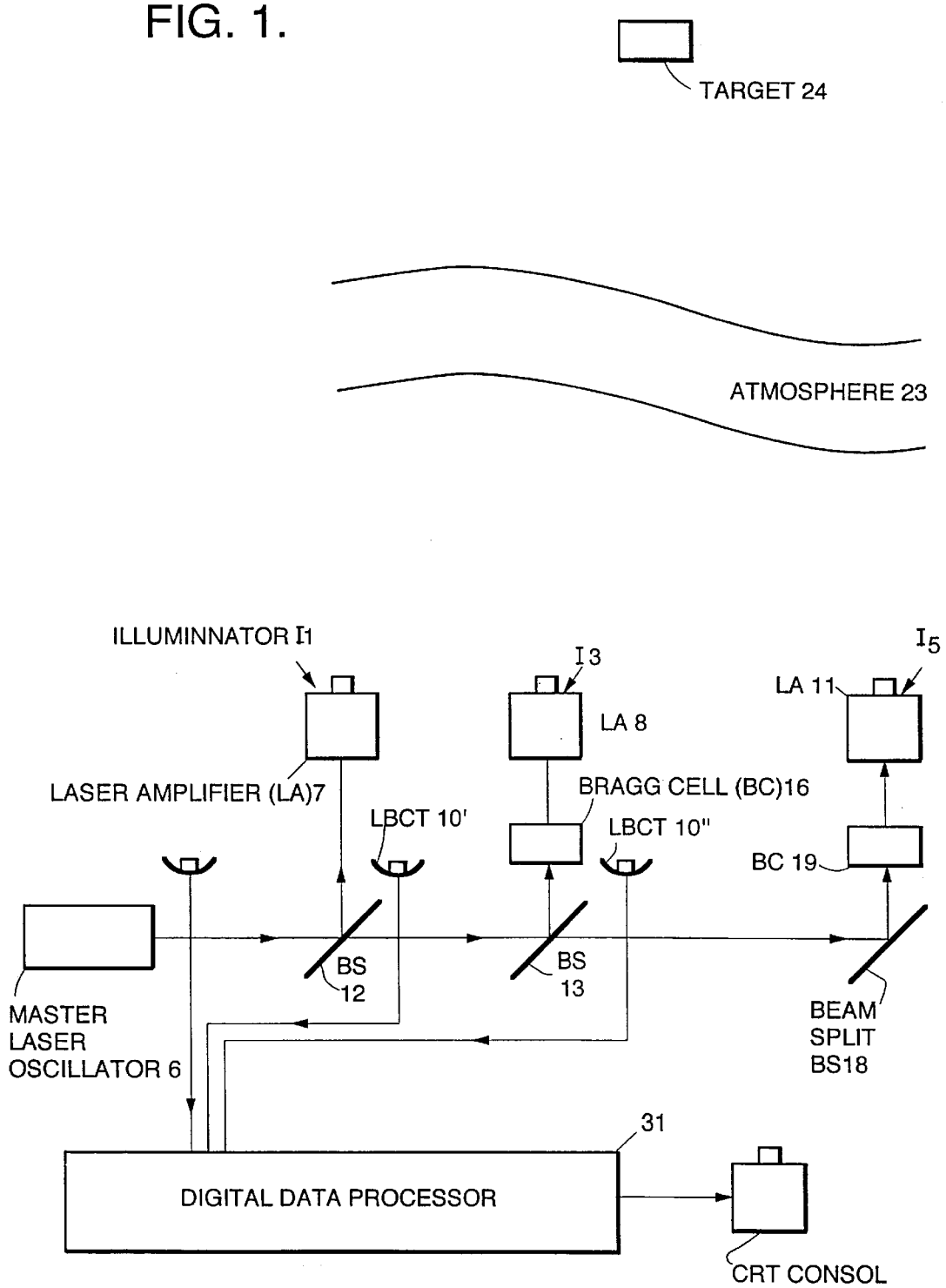
FIG. 1 illustrates certain of the illuminators positioned within the collector array, such illuminators directing light through the atmosphere at the target.

Referring to FIGS. 1 and 2, a first array of coherent light illuminators, preferably consists of illuminator 1, illuminator 3 and illuminator 5, shown aligned in FIG. 2, and also illustrated in FIG. 1. A second array of coherent illuminators, transversely aligned as illustrated in FIG. 2, consists of illuminator 1 which also is a part of the first array, along with illuminator 2 and illuminator 4. Each array, however, could consist of a single pair of illuminators with or without a common illuminator. The linear arrays are preferably perpendicular or at a sixty degree angle (for a triangular field) with respect to each other.

Figure 3:
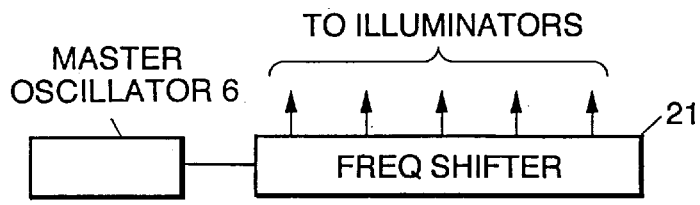
FIG. 3 illustrates schematically the frequency shifters coupled to the illuminators.

A master laser oscillator 6 is illustrated in FIG. 1 which generates light applied to laser light amplifier 7 of illuminator 1, laser light amplifier 8 of illuminator 3 and laser light amplifier 11 of illuminator 5. The light produced by oscillator 6 is directed at laser light amplifier 7 via beam splitter 12, the light produced by oscillator 6 is directed at laser amplifier 8 via bean splitter 13 and Bragg cell 16, whereas light from oscillator 6 is directed at laser amplifier 11 via beam splitter 18 and Bragg cell 19. As may be seen from FIG. 3, two other optical paths, not shown, contain similar structure energizing illuminators 2 and 4 in the second linear array, as schematically illustrated in FIG. 3, the frequency shifter unit 21 including 4 Bragg cells which function to shift the frequency of 4 illuminators.

All 5 illuminator amplifiers are simultaneously activated by master oscillator 6 and produce coherent frequency shifted beams, the light thereof being directed through atmospheric layers such as 23 at a moving noncooperative target 24. The light rebounded from target 24 is directed at the light bucket collector/transducers. Each light bucket collector is of very low optical quality, and preferably has a diameter of about one meter. The array of collectors could be circular and is between one and one hundred meters in diameter, such array containing between 100 and 50,000 collectors.

The first and second arrays of coherent illuminators are positioned within, or adjacent to, the field of collectors as indicated in FIG. 2. The light sensors or collectors such as 10 and 10' produce analog electrical signals due to a given period of illumination of about 1 micro-second, such signals being applied to a digital data processor schematically indicated as 31 in FIG. 1.

Each beam created by the illuminators produces an identical speckle pattern. If we use the speckle pattern of illuminator 1 as a reference, then the speckle pattern of illuminator 2 is typically shifted roughly 1 meter down, and the speckle pattern of illuminator 3 is shifted 1 meter to the left. Similarly, the pattern of illuminator 4 is shifted by 4 meters down and the pattern of illuminator 5 is shifted by 4 meters to the left. If each illuminator is frequency shifted by a different amount as listed in table 1 below, employing a Bragg cell on the injection beam, then the 4 necessary interference patterns all having different interference frequencies may be separated upon the reception of rebounded light from the target. In fact with the linear array described, 10 interference patterns having 10 frequencies are produced, which are useful in the reconstruction process. Typical frequency shifts of at least five MHZ are as indicated in the following table 1:

TABLE 1

| Illuminator # | Frequency Shift |
|---|---|
| 1 | −28 Mhz |
| 2 | −20 |
| 3 | 0 Mhz |
| 4 | 12 Mhz |
| 5 | 16 Mhz |

As indicated by table 2 set forth below, each interference pattern has a particular carrier frequency.

TABLE 2

| INTERFERENCE PATTERN | ILLUMINATOR | FREQUENCY |
|---|---|---|
| $A(x,y)A^*(x + \Delta,y)$ | 1,3 | 28 Mhz |
| $A(x,y)A^*(x,y + \Delta)$ | 1,2 | 8 |
| $A(x,y)A^*(x + 4\Delta,y)$ | 1,5 | 44 |
| $A(x,y)A^*(x,y + 4\Delta)$ | 1,4 | 40 |
| $A(x,y)A^*(x,y + \Delta)$ | 3,2 | 20 |
| $A(x,y)A^*(x,y + 4\Delta)$ | 3,4 | 12 |
| $A(x,y)A^*(x + 4\Delta,y)$ | 2,5 | 36 |
| $A(x,y)A^*(x,y + 4\Delta)$ | 4,5 | 4 |
| $A(x,y)A^*(x + 4\Delta,y)$ | 3,5 | 16 |
| $A(x,y)A^*(x,y + 4\Delta)$ | 2,4 | 32 |

$\Delta$ is preferably about 1 meter, so that in accordance with table 2 illuminator 3 is positioned 1 meter to the right of illuminator 1, also illuminator 5 is positioned about 4 meters to the right of illuminator 1 since the displacement called for is 4 meters (4×1=4), see line 3 of table 2. Similarly illuminator 4 is 4 meters from illuminator 1 along the Y axis in accordance with line 4 of table 2.

Figure 4:
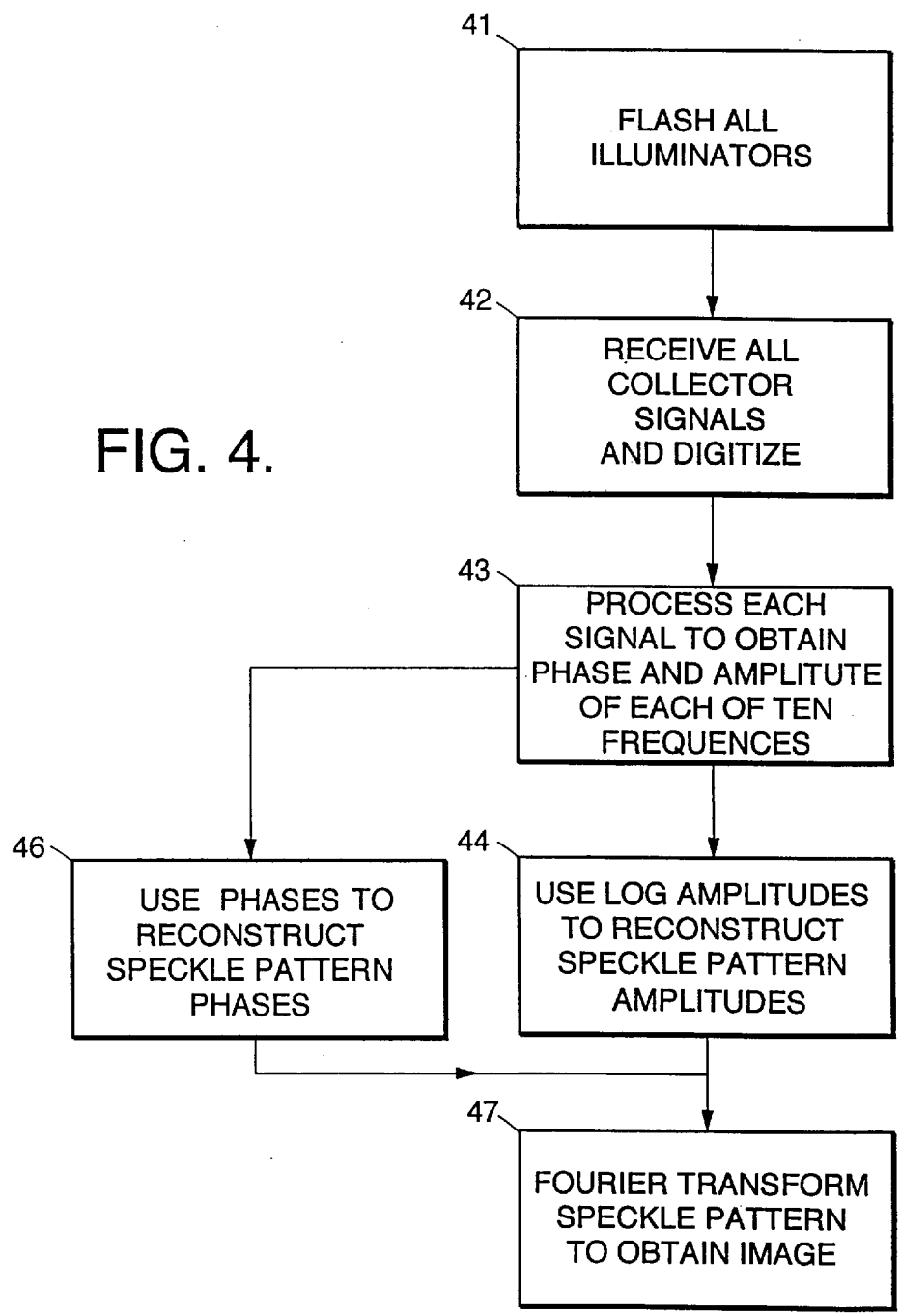
FIG. 4 illustrates a flow chart which will enable the skilled worker in the art to program the digital processing of the data generated by the collectors.

Referring now to the flow chart of FIG. 4, execution block 41 indicates the flashing of the 5 coherent light illuminators, and block 42 illustrates the reception of the resulting rebounded light from the target directed at the collectors each producing varying intensity versus time electrical signals which are digitized. As indicated by block 43, each collector signal received over the given period of about 1 micro-second, is sampled typically about every 50 nano-seconds and is transformed to obtain the phase and amplitude of each of the 10 frequencies, thereby to measure 10 phases and amplitudes values.

The resulting phase values give the differences between pairs of phase values on the speckle pattern, as is usual for an A.C. shearing interferometer. The phase shift of each frequency at each sensor location gives the phase difference for a different pair of phase values on the speckle pattern. Since there is always noise present in these phase difference measurements, they must all be combined to estimate the speckle pattern phases using an error criteria such as the common Gauss Estimator which minimizes the mean-square difference between the measurements and the corresponding phase differences of the estimated phases. There are many techniques commonly used to estimate a set of quantities given noisy estimates of linear combinations of those quantities and the invention does not depend upon which technique is employed. Block 46 indicates the use of the phase values produced by the transformation of the collector signals to reconstruct speckle pattern phases.

A similar process is used to estimate the log amplitudes of the speckle pattern. The magnitudes of each sine wave component at each sensor location is equal to the product of amplitudes at two locations in the speckle pattern. The logarithm of the magnitude is then equal to the sum of the log amplitudes of the speckle pattern at two locations. A Gauss Estimator can then be used to estimate the log amplitudes at each location in the speckle pattern and exponentiated these values give the estimates for the amplitudes themselves; block 44.

While the minimum possible number of illuminators is three, arranged in a non-collinear manner such as illuminators 1, 2, and 3 in FIG. 3, it is advantageous and thus preferred to add one or more additional illuminators separated from the first set of illuminators by two or more times the spacing of the first illuminators. The purpose of the additional illuminator (s) is to reduce the effect of the dark region in the speckle pattern by providing measurements of phase and log amplitude differences over long enough separations to jump across the dark regions. The measurements within a dark region are very noisy since there is little light available. Thus the additional measurements reduce the noise in the estimated speckle amplitude and phase values.

The data resulting from carrying out the steps represented by block 44 and block 46 is thereafter utilized to Fourier transform the resulting speckle pattern data to obtain image data representative of the target, free from the adverse atmospheric affects of turbulence. This last step schematically represented by block 47 is explained in the open literature, and reference may be made to the above stated Journal of the Optical Society of America papers. The resulting data may be applied to modulate a laser or CRT beam to obtain the target image.

Each illuminator and collector has an aperture of between 0.03 and 3 meters. The distance between illuminator 1 and illuminator 3, and illuminator 1 and 2 could be about one meter; in contrast, the distance between illuminator 1 and illuminators 5 and 4 could be typically about 4 meters. The distances are proportional to the illuminator wavelength and depend inversely on the angular size of the target, where the above distances correspond to a target of 0.125 micro-radian size with a laser wavelength of 0.5 micrometers. The distances between the illuminators and the collectors are about equal (s=s' in FIG. 2), and the distances between illuminator 3 and 5 (also 2 and 4) should be at least twice the distances between illuminator 1 and illuminators 2 and 3.

Thus, in contrast with the PLP technique, the MPLP technique of this invention in a ground based system produces copies of interference patterns before the light passes through the atmosphere. Since changes of phase are converted into intensity signals before the light goes through the atmosphere, the signals are almost immune to atmospheric turbulence effects, since intensity is not changed significantly by such turbulence.

In summary, in accordance with the currently most preferred method, 5 coherent light pulses are simultaneously transmitted each having their own temporal frequency, and 5 pulses interfere in 10 combinations to form 10 different shearing interferograms, each with its unique frequency. The low quality light bucket collectors produce electrical signals of intensity versus time, and each frequency component thereof is separated out by known bin processing techniques to measure phase and amplitude. The total phase/amplitude information is used with a weighted least squares estimator to obtain wavefront amplitudes and phases which best fit the data. The technique may be implemented by matrix inversion or matrix relaxation techniques known to those skilled in the are.

The collector signals received are exactly analogous to signals produced by an A.C. shearing interferometer, thus standard data processing for A.C. shearing interferometers may be employed to reconstruct the speckle wavefront such as four bin processing and zero crossing phase detection techniques known in the art, rather than the Fourier transformation of each collector signal. Four bin processing is presently preferred; see copending patent application 621, 408 filed Jun. 18, 1984 in the name of Bruce Horwitz and assigned to Itek Corporation. See also my U.S. Pat. No. 4,488,172, and in particular Col. 13 thereof.

Equivalents will be apparent to those skilled in the art and thus the invention is to be limited only by the language of the following claims and equivalents. The term "light" is to include any suitable electromagnetic radiation, and is not to be restricted to visible light.

I claim:

1. A method of producing an image of a target by reconstructing a target speckle pattern and using said target speckle pattern to produce image information about said target comprising the steps of:

a. providing an array of light collectors having a given spacing there between;

b. providing a first array having at least a pair of coherent light illuminators and a second array having at least a pair of coherent light illuminators, said second array being positioned transverse to said first array;

c. illuminating said target by exciting all of said illuminators at least two at a time in said first and second arrays during a given period while causing at least one illuminator excited at any one time to be frequency shifted to provide an A.C. modulation on the resulting interference patterns;

d. recording collector signals indicative of the varying intensity of light received at each of said light collectors from said target; and e. processing said collector signals to derive image information about said target.

2. The method of claim 1 wherein step e includes estimating the amplitude and phase of said target speckle pattern.

3. The method of claim 2 further including f. utilizing the phase information produced by step e to reconstruct the phases of the speckle pattern;

g. utilizing the amplitude information produced by step e to reconstruct the amplitudes of the speckle pattern; and h. fourier transforming the data produced by steps f and g to obtain data indicative of said image of said target.

4. The method of claim 1 wherein said plurality of interference patterns are formed before they enter the atmosphere, thereby to eliminate the effects of atmospheric turbulence upon said image of said target.

5. The method of claims 1, 2, 3, or 4 wherein said first array of illuminator comprises a first illuminator, a third illuminator separated from said first illuminator by about said spacing between said collectors, and a fifth illuminator separated from said third illuminator by a distance of at least twice said spacing between said collectors, and wherein said second array of illuminators comprises said first illuminator, a second illuminator separated from said first illuminator by about said spacing between said collectors and a fourth illuminator separated from said second illuminator by a distance of at least twice said spacing between said collectors.

6. The method of claim 5 wherein said given period is about one microsecond, said collector signals are sampled about every 50 nano-seconds and wherein said frequency shifting between said illuminators is about five megahertz.

7. The method of claims 1, 2, 3, or 4 wherein the apertures of said coherent illuminators and said collectors are between 0.03 and 3 meters in diameter.

8. The method of claim 5 wherein the apertures of said coherent illuminators and said collectors are between 0.03 and 3 meters in diameter.

9. The method of claim 6 wherein the apertures of said coherent illuminators and said collectors are between 0.03 and 3 meters in diameter.

10. The method of claims 1, 2, 3, or 4 wherein said array of light collectors has a major dimension of between one and one hundred meters.

11. The method of claim 5 wherein said array of light collectors has a major dimension of between one and one hundred meters.

12. The method of claim 6 wherein said array of light collectors has a major dimension of between one and one hundred meters.

13. The method of claim 7 wherein said array of light collectors has a major dimension of between one and one hundred meters.

14. The method of claim 8 wherein said array of light collectors has a major dimension of between one and one hundred meters.

15. The method of claims 1, 2, 3, or 4 wherein said array of light collectors consists of 100–50,000 light collectors.

16. The method of claim 5 wherein said array of light collectors consists of 100–50,000 light collectors.

17. The method of claim 7 wherein said array of light collectors consists of 100–50,000 light collectors.

18. The method of claim 8 wherein said array of light collectors consists of 100–50,000 light collectors.

19. The method of claim 10 wherein said array of light collectors consists of 100–50,000 light collectors.

20. A method of producing an image of a target by reconstructing a target speckle pattern and using said target speckle pattern to produce image information about said target comprising the steps of:
   a. providing a field of light collectors having a given spacing there between;
   b. providing a first linear array having at least a pair of coherent light illuminators and a second linear array having at least a pair of coherent light illuminators, said second array being positioned at an angle with respect to said first array, said angle selected from the group consisting of 60° and 90°;
   c. illuminating said target by exciting all of said illuminators, at least two at a time in said first and second arrays during a given period while causing at least one illuminator excited at any one time to be frequency shifted to provide an A.C. modulation on the resulting interference patterns;
   d. recording collector signals indicative of the varying intensity of light received at each of said light collectors from said target; and
   e. processing said collector signals to derive image information about said target.

21. The method of claim 20 wherein step e includes estimating the amplitude and phase of said target speckle pattern.

22. The method of claim 21 further including
   f. utilizing the phase information produced by step e to reconstruct the phases of the speckle pattern;
   g. utilizing the amplitude information produced by step e to reconstruct the amplitudes of the speckle pattern; and
   h. fourier transforming the data produced by steps f and g to obtain data indicative of said image of said target.

23. The method of claim 20 wherein said plurality of interference patterns are formed before they enter the atmosphere, thereby to eliminate the effects of atmospheric turbulence upon said image of said target.

24. The method of claims 20, 21, 22, or 23 wherein said first array of illuminators comprises a first illuminator, a third illuminator separated from said first illuminator by about said spacing between said collectors, and a fifth illuminator separated from said third illuminator by a distance of at least twice said spacing between said collectors, and wherein said second array of illuminators comprises said first illuminator, a second illuminator separated from said first illuminator by about said spacing between said collectors and a fourth illuminator separated from said second illuminator by a distance of at least twice said spacing between said collectors.

25. The method of claim 24 wherein said given period is about one microsecond, said collector signals are sampled about every 50 nanoseconds and wherein said frequency shifting between said illuminators is about five megahertz.

26. The method of claims 20, 21, 22, or 23 wherein the apertures of said coherent illuminators and said collectors are between 0.03 and 3 meters in diameter.

27. The method of claim 24 wherein the apertures of said coherent illuminators and said collectors are between 0.03 and 3 meters in diameter.

28. The method of claim 25 wherein the apertures of said coherent illuminators and said collectors are between 0.03 and 3 meters in diameter.

29. The method of claims 20, 21, 22, or 23 wherein said array of light collectors has a major dimension of between one and one hundred meters.

30. The method of claim 24 wherein said array of light collectors has a major dimension of between one and one hundred meters.

31. The method of claim 25 wherein said array of light collectors has a major dimension of between one and one hundred meters.

32. The method of claim 26 wherein said array of light collectors has a major dimension of between one and one hundred meters.

33. The method of claim 27 wherein said array of light collectors has a major dimension of between one and one hundred meters.

34. The method of claims 20, 21, 22, or 23 wherein said array of light collectors consists of 100–50,000 light collectors.

35. The method of claim 24 wherein said array of light collectors consists of 100–50,000 light collectors.

36. The method of claim 26 wherein said array of light collectors consists of 100–50,000 light collectors.

37. The method of claim 27 wherein said array of light collectors consists of 100–50,000 light collectors.

38. The method of claim 30 wherein said array of light collectors consists of 100–50,000 light collectors.

* * * * *